(12) United States Patent  
Nakatani et al.

(10) Patent No.: US 6,876,407 B2  
(45) Date of Patent: Apr. 5, 2005

(54) LIQUID CRYSTAL DISPLAY APPARATUS

(75) Inventors: Yoshiki Nakatani, Nara (JP); Shigeru Aomori, Kashiwa (JP); Tomoko Maruyama, Kashiwa (JP)

(73) Assignee: Sharp Kabushiki Kaisha, Osaka (JP)

( * ) Notice: Subject to any disclaimer, the term of this patent is extended or adjusted under 35 U.S.C. 154(b) by 6 days.

(21) Appl. No.: 10/400,461

(22) Filed: Mar. 28, 2003

(65) Prior Publication Data

US 2003/0227587 A1 Dec. 11, 2003

(30) Foreign Application Priority Data

Mar. 29, 2002 (JP) ..................................... P2002-096873  
Mar. 3, 2003 (JP) ..................................... P2003-056288

(51) Int. Cl.[7] .......................... G02F 1/135; G02F 1/136; G02F 1/1335
(52) U.S. Cl. ............................. 349/49; 349/51; 349/113
(58) Field of Search ............................ 349/49–52, 113, 349/148

(56) References Cited

U.S. PATENT DOCUMENTS 5,521,731 A    5/1996    Fukuyama et al. ........... 349/51
5,734,452 A  *  3/1998    Yamaue et al. ............... 349/49
5,883,683 A  *  3/1999    Yamaue et al. ............... 349/49

FOREIGN PATENT DOCUMENTS

| JP | 3-46632 A   | 2/1991  |
| JP | 6-214220 A  | 8/1994  |
| JP | 6-235940 A  | 8/1994  |
| JP | 8-271932 A  | 10/1996 |
| JP | 8-286198 A  | 11/1996 |
| JP | 9-22030 A   | 1/1997  |

* cited by examiner

*Primary Examiner*—Dung T. Nguyen  
(74) *Attorney, Agent, or Firm*—Birch, Stewart, Kolasch & Birch, LLP

(57) ABSTRACT

A thin film two-terminal element is formed by laminating a protruding portion of a second conductor layer on a first conductor layer via a nonlinear resistor layer. An insulator layer is positioned between the first conductor layer and the second conductor layer except a region to become the thin film two-terminal element. Therefore, the allowance of the relative position of the second conductor layer with respect to the first conductor layer and the nonlinear resistor layer is considerably large as compared with that of prior art, and it is possible to ensure a requisite alignment margin with respect to deformation of the substrate in the production process.

10 Claims, 15 Drawing Sheets

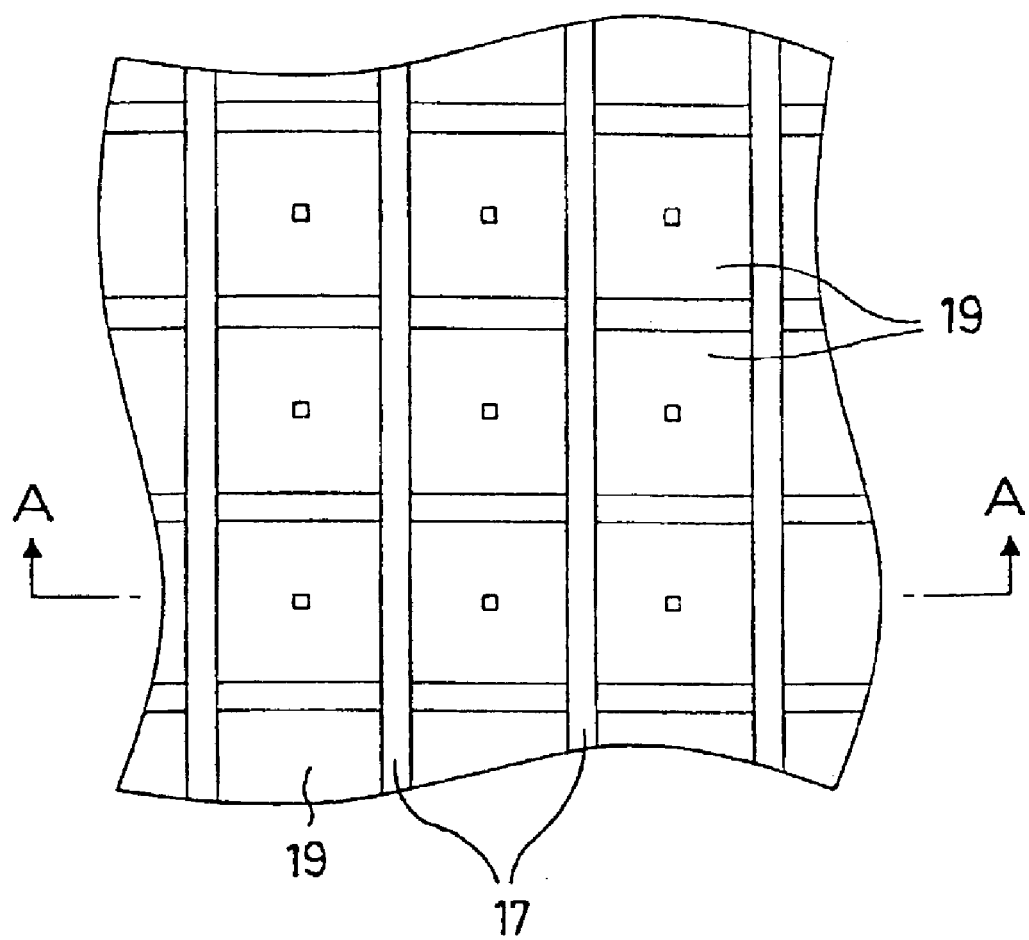

19b 19 19b 19

LIQUID CRYSTAL DISPLAY APPARATUS

This nonprovisional application claims priority under 35 U.S.C. §119(a) on Patent Application No(s). 2002-96873 and 2003-56288 filed in JAPAN on Mar. 29, 2002 and Mar. 3, 2003, respectively, which is (are) herein incorporated by reference.

BACKGROUND OF THE INVENTION

1. Field of the Invention

The present invention relates to a reflective-type liquid crystal display apparatus, and relates to a reflective-type liquid crystal display apparatus which is preferably applied to an office automation system, a personal computer, a personal digital assistant, a cell phone and the like.

2. Description of the Related Art

As multimedia progresses rapidly in society, various kinds of information media are being considered for implementation as electronic devices. One case thereof is information whose medium is paper such as printed matter, for which it would be desirable to develop a display apparatus in the form of electronic paper, for example. This display apparatus is as thin as paper and can be elastically deformed as necessary. Furthermore, this display apparatus is required to be capable of high definition display of characters and charts at the same level as printed matter. One type of display apparatus that has been considered is the use of a reflective-type liquid crystal display apparatus of an active matrix driving system, in which plastic or a resin film being elastically deformable is used as a substrate and a voltage applied to a liquid crystal layer is controlled by a switching element.

In the reflective-type liquid crystal display apparatus, a switching element used mainly is a thin film transistor element (a TFT element) and a metal insulator metal element (an MIM element), which is a thin film two-terminal element. Since, of these switching elements, a TFT element is normally produced at a temperature of approximately 300° C. or more, it is difficult to use plastic or a resin film as a substrate because a heat-resistance temperature thereof is limited. On the other hand, since a production temperature of a thin film two-terminal element is set to approximately 180° C. or less, a limitation of a heat-resistance temperature thereof is loosened largely as compared with in that of the TFT element. Therefore, as disclosed in Japanese Unexamined Patent Publications JP-A 6-214220 (1994), JP-A 8-271932 (1996) and JP-A 8-286198 (1996), it is possible to use plastic or a resin film as a substrate, and it is studied to use a reflective-type liquid crystal display apparatus having an elastically deformable substrate in various ways.

FIG. 15 is a plan view showing one pixel of a reflective-type liquid crystal display apparatus in which a conventional thin film two-terminal element is formed. In production of an element-side substrate of the reflective-type liquid crystal display apparatus, a tantalum film, that is, a Ta film is formed on an insulating resin substrate 1 firstly, and thereafter, a first conductor layer 2 to become wiring and a lower-layer electrode is formed by photolithography and etching. Secondly, the surface of the first conductor layer 2 is anodized, and a nonlinear resistance film is formed. Next, after a titanium film is formed on the resin substrate 1, a second conductor layer 3 to become an upper-layer electrode is formed by performing photolithography and etching again. After that, an aluminum film is formed on the resin substrate 1, and then, a third conductor layer 4 which becomes a pixel electrode and a reflection layer is formed by performing photolithography and etching again.

In the case of using the resin substrate in a reflective-type liquid crystal display apparatus, the deformation ratio of the substrate in processing is, for example, approximately 10 to 1000 ppm, and for allowing this, there is a need to ensure an alignment margin of approximately 10 $\mu$m or more. On the other hand, in the case of using a glass substrate in a reflective-type liquid crystal display apparatus, the deformation ratio of the substrate in processing is approximately 10 ppm or less, and a design margin for allowing deformation at alignment is designed with accuracy of, for example, approximately 10 $\mu$m or less. In the case of a panel having approximately 4 inch diagonal lines which is approximately 8 cm in a row direction (R direction) and approximately 6 cm in a column direction (C direction) in size, assuming that the deformation ratio of a resin substrate in processing is, for example, 300 ppm, values of size deformation of the substrate is 24 $\mu$m in the row direction obtained by multiplying the deformation ratio 300 ppm and the row-direction size $8 \times 10^{-2}$ m together and 18 $\mu$m in the column direction obtained by multiplying the deformation ratio 300 ppm and the column-direction size $6 \times 10^{-2}$ m together.

In a production method of a substrate of Japanese Unexamined Patent Publication JP-A 3-46632 (1991), a technique of enabling reduction of a region necessary for ensuring an alignment margin is disclosed. In the production method, lower electrode wiring and a reflective pixel electrode are formed by the use of a reflective metal film, and an upper electrode is combined with it, whereby a thin film two-terminal element is formed by two exposure processes in all.

The prior art of using plastic or a resin film as a substrate has the following problems. That is to say, a plastic or resin film substrate to become an insulating substrate constituting a liquid crystal display apparatus has a lower heat-resistance temperature than a glass substrate. Furthermore, resulting from changes in temperature and humidity, a change in size, that is, deformation such as extension or shrinkage tends to appear in the substrate. Moreover, there is a problem that the substrate is warped and deformed by stresses from various kinds of thin films formed on the substrate. For example, according to pages 6 to 8 of Electronic Engineering July, 2000, the linear expansion coefficient of a resin film substrate used in a liquid crystal display apparatus is approximately ten times the linear expansion coefficient of a glass substrate. In consequence, by a change in temperature of, for example, 1° C., the size of the substrate is changed, that is, the substrate is deformed approximately ten times. Therefore, in a production process of an active element which needs an accurate alignment process such as a thin film two-terminal element, it is difficult to obtain sufficient accuracy of the size of a substrate. In a case where an alignment margin is set largely to accommodate for deformation of a substrate, alignment of various kinds of thin films to the substrate is enabled, whereas an aperture ratio, that is, the ratio of an actual active screen area to a display screen area of a liquid crystal display apparatus is decreased. In consequence, not only a display character is degraded, but also a sufficient margin is not ensured in designing a minute pixel for high definition display.

In the case of using the resin substrate 1 in a reflective-type liquid crystal display apparatus as shown in FIG. 15, it is necessary to set an alignment margin α in the row direction of a relation between the first conductor layer 2 and the third conductor layer 4 and an alignment margin γ in the column direction of a relation between the first conductor layer 2 and the second conductor layer 3 to 24 $\mu$m, respectively, and it is necessary to set an alignment margin β in the column direction of a relation between the first conductor layer 2 and the third conductor layer 3 and an alignment margin δ in the column direction of a relation between the second conductor layer 3 and the third conductor layer 4 to 18 μm, respectively. As a result, the aperture ratio of the reflective-type liquid crystal display apparatus is decreased, and the display character thereof is degraded. Besides, since the alignment margins in the column direction and the row direction become large as the panel size becomes large, it is necessary to make the size of a pixel large enough to ensure necessary margins, and therefore, high definition display is impossible.

According to the production method disclosed in JP-A 3-46632, an exposure process in which alignment is required is executed only once, so that it is possible to reduce regions necessary for ensuring alignment margins. A metal film which forms an electrode constituting a thin film two-terminal element and a reflective pixel electrode can be made of a material such as tantalum Ta or aluminum Al. However, as for tantalum Ta, an element characteristic of a thin film two-terminal element using an anodized film of tantalum Ta is sufficient, whereas as a reflective pixel electrode, the reflectance thereof is approximately half of that of aluminum Al used in general, and a sufficient characteristic cannot be obtained. In the case of using aluminum Al, a performance of a reflective pixel electrode can be obtained, whereas a thin film two-terminal element using an anodized film of aluminum Al cannot have a requisite element characteristic. In consequence, it is impossible to obtain characteristics required for a thin film two-terminal element and a reflective electrode, respectively, at the same time, and it is necessary to sacrifice either characteristic.

FIG. 16 is a perspective view showing, by cutting away, a substantial part of a conventional reflective-type liquid crystal display apparatus 5 disclosed in Japanese Unexamined Patent Publication JP-A 6-235940 (1994). In this reflective-type liquid crystal display apparatus 5, a first conductor 6 of an MIM element constituted by a nonlinear resistor 7 and a second conductor 8 is made to be signal wiring, the second conductor 8 is made to be a pixel electrode and a reflector, and the nonlinear resistor 7 and the second conductor 8 are formed on the first conductor 6, so that a site for only the signal wiring and a site for only a thin film two-terminal element are not required. Therefore, it is possible to make the spacing of pixels narrow, so that it is possible to make the spacing of pixels narrow and make the area of a pixel large, and it is possible to increase an aperture ratio. However, since the nonlinear resistor 7 is placed in the same region and with the same area as the second conductor 8, there is a problem that it is difficult to ensure alignment margins when overlaying and forming the first conductor 6, the nonlinear resistor 7 and the second conductor 8.

Although the above problems are tasks in using plastic or a resin film for a substrate, in a case where it is desired to develop a higher definition display apparatus, an alignment margin at the time of production and an aperture ratio are of a problem also in a glass substrate.

SUMMARY OF THE INVENTION

Accordingly, an object of the invention is to provide a liquid crystal display apparatus which enables a requisite alignment margin to be ensured with respect to deformation of a substrate in a production process and a high aperture ratio and high definition display to be realized.

The invention provides a liquid crystal display apparatus comprising:

a one-side substrate and an other-side substrate which are oppositely positioned a specified space apart;

a liquid crystal layer which is interposed between the one-side substrate and the other-side substrate;

a first conductor layer which is formed into a strip on a surface of one of the one-side substrate and the other-side substrate, the surface being on the other substrate side;

a second conductor layer which is disposed to the one substrate; and a nonlinear resistor layer which is formed on the first conductor layer, wherein:

at least part of the second conductor layer is laminated via the nonlinear resistor layer to form at least one or more thin film two-terminal element, and an insulator layer is provided between the first conductor layer and the second conductor layer except a region to become the thin film two-terminal element; and full faces of the first conductor layer and the second conductor layer within a display region except a part for forming the nonlinear resistor layer, wiring, and a part for separating electrodes are positioned on both sides of the insulator layer.

According to the invention, the first conductor layer is formed into a strip on a surface of one substrate of either the one-side substrate or the other-side substrate, the surface being on the other substrate side. The nonlinear resistor layer is formed on the first conductor layer. At least one thin film two-terminal element is formed by laminating at least part of the second conductor layer on the first conductor layer via the nonlinear resistor layer. The insulator layer is positioned between the first conductor layer and the second conductor layer except a region to become the thin film two-terminal element. In production of the thin film two-terminal element, processes in which alignment is necessary are, for example, a process for defining a region for forming the nonlinear resistor layer and a process for defining the shape of the second conductor layer, and it is possible to ensure a requisite alignment margin with respect to thermal deformation of the substrate in the respective processes. In consequence, the allowable range of the relative position of the second conductor layer to the first conductor layer and the nonlinear resistor conductor is considerably larger than that of the prior art, and it is possible to ensure a requisite alignment margin with respect to deformation of the substrate in the production process, so that it is possible to facilitate production of the thin film two-terminal element. Moreover, since a site for only signal wiring and a site for only the thin film two-terminal element are not required, it is possible to make the spacing of pixels narrow. In consequence, it is possible to increase an aperture ratio.

Further, in the invention it is preferable that the nonlinear resistor layer is disposed to a side face of the first conductor layer.

According to the invention, one of the elements that define the area of an electrode of a thin film two-terminal element is the film thickness of the first conductor layer, so that it is easy to produce a thin film two-terminal element which has a minute electrode area.

Still further, in the invention it is preferable that a pixel electrode formed by the second conductor layer, and the first conductor, the nonlinear resistor layer and the insulator layer for forming the thin film two-terminal element are formed also in a peripheral region of a designed display region.

According to the invention, one of the elements that define the display pixel is a region where a first conductor layer and a transparent conductor layer of an opposite substrate are opposite to each other on both sides of a liquid crystal layer are intersected, so that by forming the first conductor layer, the nonlinear resistor layer and the insulator layer also in a peripheral region of a designed display region, and it is possible to ensure a larger alignment margin.

Still further, in the invention it is preferable that the second conductor layer has an optically reflecting function.

According to the invention, the second conductor layer is capable of optically reflecting by itself, and therefore, capable of combining three functions of an upper electrode of the thin film two-terminal element, a pixel electrode for applying a voltage to the liquid crystal layer, and an optical reflecting plate.

Still further, in the invention it is preferable that the nonlinear resistor layer is an anodized film of the first conductor layer.

According to the invention, it is possible to form the nonlinear resistor layer by partially anodizing the surface of the first conductor layer after forming the first conductor layer. Therefore, it is possible to further facilitate the production process.

Still further, in the invention it is preferable that the one substrate is made of a resin material.

According to the invention, as compared with a glass substrate, it becomes possible to make the substrate itself thin, and moreover, it becomes possible to elastically deform as necessary. In consequence, it is possible to apply a substrate made of a resin material to various reflective-type liquid crystal display apparatuses, and it is possible to increase the versatility thereof.

Still further, in the invention it is preferable that another insulator layer is further disposed between the one substrate and the thin film two-terminal element.

According to the invention, it is possible to protect the one substrate by the insulator layer, and moreover, it can be prevented that an impurity is discharged from the substrate.

Still further, in the invention it is preferable that the second conductor layer is to become a pixel electrode and the second conductor layer includes a plurality of pixel electrodes in one pixel.

According to the invention, one pixel is divided by a plurality of pixel electrodes, so that the spacing of patterns of the pixel electrodes is short. Therefore, it is possible to make pattern displacement of the pixel electrodes small apparently. Moreover, by making the spacing of patterns of the pixel electrodes shorter and increasing the number of the pixel electrodes in one pixel, it is possible to make pattern displacement of the pixel electrodes smaller apparently, and because of manifestation of the effect of averaging by numbers, it is possible to allow variances in the shapes and areas of the pixel electrodes. Therefore, under a condition of having a certain average value as the number of the pixel electrodes in one pixel, it is possible to make the shapes and sizes of the pixel electrodes have distributions. More specifically, it is possible to make the shapes and sizes of the pixel electrodes random. As a result, it is possible to eliminate pattern displacement of the pixel electrodes apparently.

Still further, in the invention it is preferable that a plurality of thin film two-terminal elements are formed with respect to one pixel electrode formed by the second conductor layer.

According to the invention, the spacing of patterns for forming the thin film two-terminal element is short. Therefore, it is possible to reduce displacement of the patterns for forming the thin film two-terminal element apparently. Moreover, by making the spacing of the patterns for forming the thin film two-terminal element shorter and increasing the number of the thin film two-terminal elements with respect to one pixel electrode, it is possible to reduce displacement of the patterns for forming the thin film two-terminal element apparently, and because of manifestation of the effect of averaging by numbers, it is possible to allow variances in the shapes and areas of the thin film two-terminal elements. Therefore, under a condition of having a certain average value as the number of the thin film two-terminal elements in one pixel electrode, it is possible to make the shapes and sizes thereof have distributions. More specifically, it is possible to make the shapes and sizes of the thin film two-terminal elements random. As a result, it is possible to eliminate displacement of the patterns for forming the thin film two-terminal elements apparently.

BRIEF DESCRIPTION OF THE DRAWINGS

Other and further objects, features, and advantages of the invention will be more explicit from the following detailed description taken with reference to the drawings wherein:

FIG. 3 is a plan view of an element-side substrate;

DETAILED DESCRIPTION OF THE PREFERRED EMBODIMENTS

Figure 1:
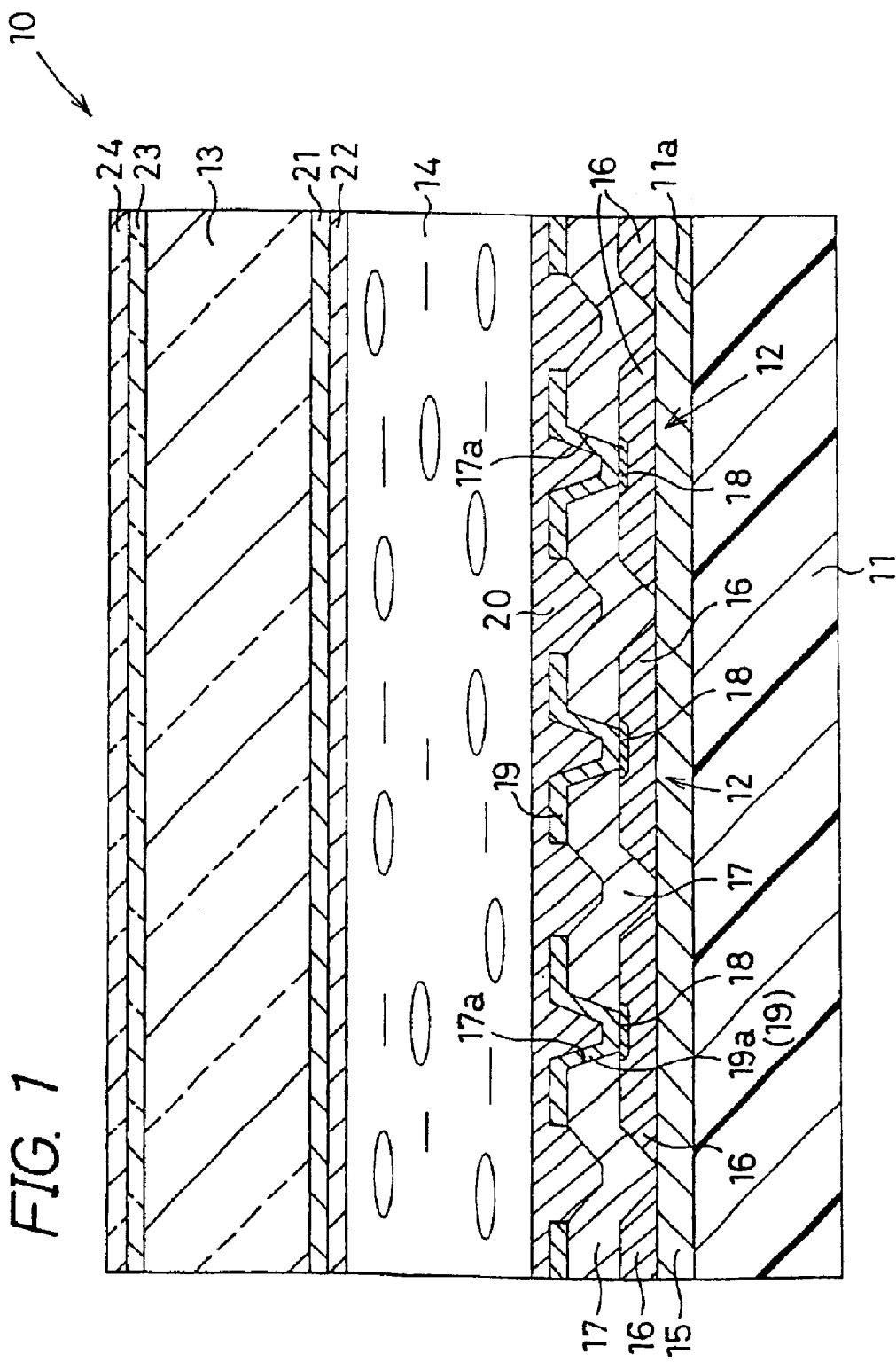
FIG. 1 is a sectional view showing a constitution of a reflective-type liquid crystal display apparatus relating to an embodiment of the invention.

Now referring to the drawings, preferred embodiments of the invention are described below.

An example of production of a reflective-type liquid crystal display apparatus is shown in the following as an embodiment of the invention.

[First Embodiment]

Figure 2:
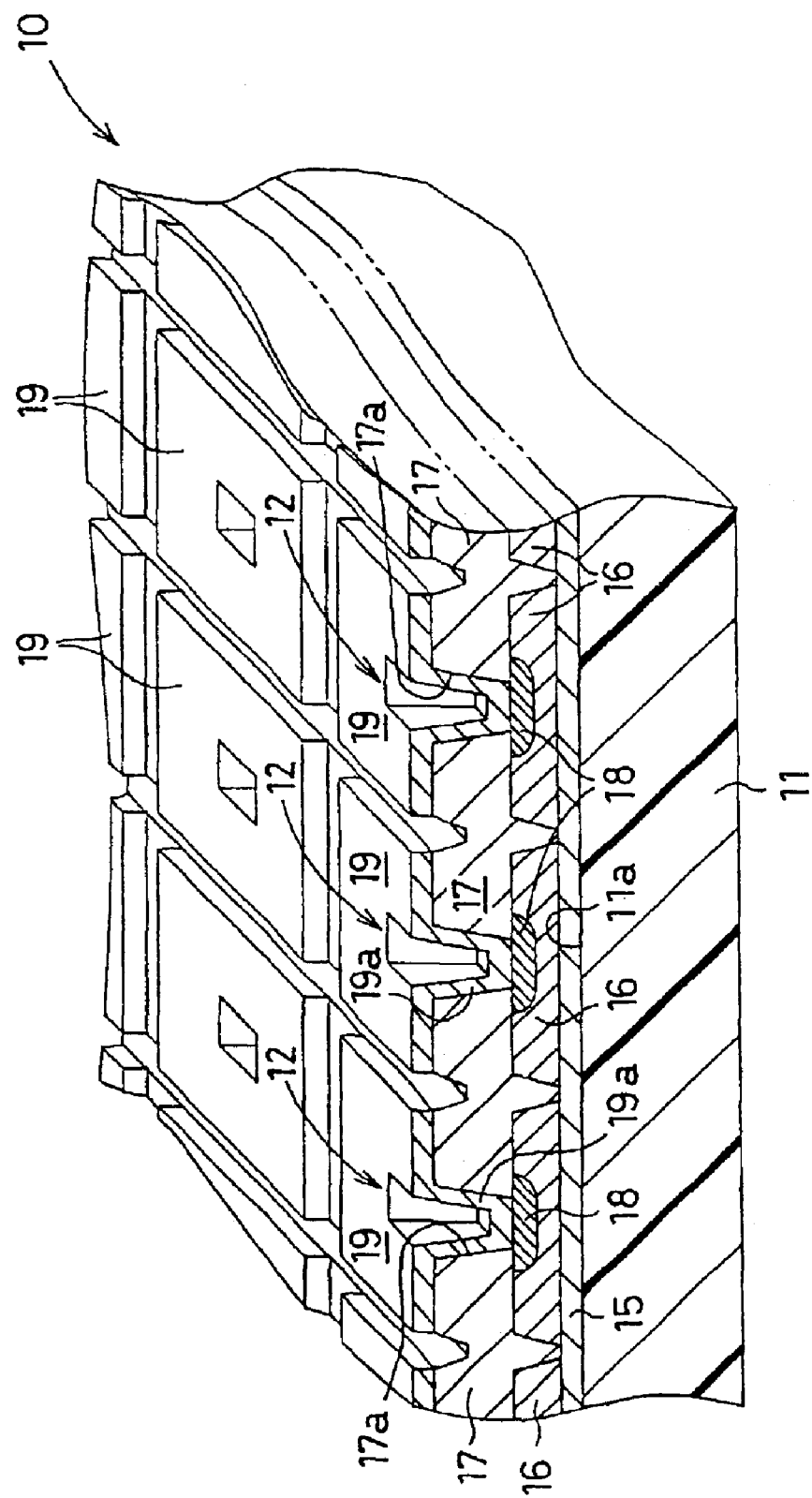
FIG. 2 is a perspective view showing, by cutting away, a substantial part of the reflective-type liquid crystal display apparatus.

FIG. 1 is a sectional view showing a constitution of a reflective-type liquid crystal display apparatus 10 relating to an embodiment of the invention, FIG. 2 is a perspective view showing, by cutting away, a substantial part of the reflective-type liquid crystal display apparatus 10, and FIG. 3 is a plan view of an element-side substrate 11. In this embodiment, an example of applying a reflective-type liquid crystal display apparatus of the invention to an office automation system or the like is shown. In FIG. 1, one side of the reflective-type liquid crystal display apparatus 10 in the thickness direction is shown upward, the other side in the thickness direction is shown downward, one side of a pixel in the alignment direction, which is either a main scanning direction or a sub-scanning direction, is shown leftward, and the other side in the alignment direction is shown rightward. The reflective-type liquid crystal display apparatus 10 is provided with the element-side substrate 11 serving as a one-side substrate, a thin film two-terminal element 12, an opposite substrate 13 serving as an other-side substrate, and a liquid crystal layer 14.

The element-side substrate 11 is made of a polymeric resin material such as polycarbonate (PC) or polyethersulfone (PES), and formed into a flat substrate which has a thickness of approximately 50 $\mu$m or more and 700 $\mu$m or less (approximately 400 $\mu$m in this embodiment). On an upper face 11a (a surface) of the element-side substrate 11, via an insulator layer 15 made of aluminum oxide AlOx or the like, a plurality of first conductor layers 16 are formed into band shapes along the front-to-back direction and at minute intervals along the horizontal direction. The first conductor layer 16 is a metal layer to become wiring and a lower electrode, and the first conductor layer 16 is, for example, made of tantalum Ta and formed so as to have a film thickness of approximately 50 nm or more and 350 nm or less, preferably, 150 nm or less.

On the upper faces of the first conductor layers 16, insulator layers 17 which cover the most part of the first conductor layers 16 and gaps between the adjacent first conductor layers are formed. The insulator layer 17 is, for example, made of silicon oxide SiOx and formed so as to have a film thickness of 300 nm or more and 1500 nm or less, preferably, 1000 or more. On the insulator layers 17, in positions corresponding to substantially middle parts of the respective first conductor layers 16 in the horizontal direction, substantially rectangular piercing portions 17a which pierce in the vertical direction are formed at specified intervals along the front-to-back direction. On an upper face of the first conductor layer 16 which includes an upper face thereof fronting onto the piercing portion 17a and which has a surface area slightly larger than that of the upper face, a nonlinear resistor layer 18 is formed. This nonlinear resistor layer 18 is an anodized film of the first conductor layer 16, and in a case where the first conductor layer 16 is made of tantalum Ta as described above, the nonlinear resistor layer is made of tantalum oxide TaOx, formed so as to have a film thickness of approximately 20 nm or more and 100 nm or less, preferably, 60 nm or more, and formed so as to be substantially flush with the upper face of the first conductor layer.

A plurality of second conductor layers 19 which cover the most part of the insulator layers 17 continuously with the piercing portions 17a are formed in a state where one parts 19a abut on the nonlinear resistor layers 18 through the piercing portions 17a. Each of the second conductor layers 19 is made of metal such as aluminum having high light reflectivity in a visible region, and formed into a substantially rectangular shape in plan view so as to have a film thickness of approximately 100 nm or more and 500 nm or less, preferably, 300 nm or more. The second conductor layers 19 are positioned at specified intervals in the front-to-back direction above the respective band-shaped first conductor layers 16. On each of the second conductor layers 19, in the vicinity of the center part of a lower face thereof, the one part (also referred to as a protruding portion) 19a stretched downward by a specified small distance is formed in one piece, and in a state where the protruding portion 19a is tightly inserted into the piercing portion 17a, the tip of the protruding portion 19a is placed so as to abut on the nonlinear resistor layer 18. Moreover, the protruding portion 19a is formed into a hollow shape fronting above the second conductor layer 19. The thin film two-terminal element 12 is formed by laminating the protruding portion 19a of the second conductor layer 19 on the first conductor layer 16 via the nonlinear resistor layer 18, and therefore, between the first conductor layer 16 and the second conductor layer 19. The insulator layer 17 is positioned in a region except a region to become the thin film two-terminal element 12. On the element-side substrate 11 with the thin film two-terminal elements 12 formed, a liquid crystal orientation film 20 is formed. This liquid crystal orientation film 20 has a function of increasing smoothness, and is formed by applying polyimide to the upper faces of the second conductor layers 19 and the insulator layers 17 and then baking. After the liquid crystal orientation film 20 is formed, the liquid crystal orientation film 20 is rubbed.

The opposite substrate 13 is made of a translucent material such as glass, and positioned fronting onto the second conductor layers 19 and opposite to the element-side substrate 11 a specified space apart. On the lower face of the opposite substrate 13 fronting onto the liquid crystal layer 14 described later, via a plurality of transparent conductor layers 21, a liquid crystal orientation film 22 is formed. The transparent conductor layers 21 to become wiring and opposite-side pixel electrodes are formed into band shapes along the horizontal direction and at minute intervals along the front-to-back direction. Each of the transparent conductor layers 21 is, for example, made of indium tin oxide (ITO) and formed so as to have a film thickness of approximately 50 nm or more and 350 nm or less, preferably, 150 nm. The liquid crystal orientation film 22 has a function of increasing smoothness, and is formed by applying polyimide to the lower faces of the transparent conductor layers 21 and then baking. After the liquid crystal orientation film 22 is formed, the liquid crystal orientation film 22 is rubbed. On the upper face of the opposite substrate 13, which is on the opposite side to the liquid crystal layer 14, a light scattering transmission plate 24 is attached via a polarizing plate 23.

Between the element-side substrate 11 and the opposite substrate 13, the liquid crystal layer 14 is interposed. More specifically, the element-side substrate 11 and the opposite substrate 13 are adhered to each other by an adhesive or the like via a spacer not shown in the views, and liquid crystal is injected inside by degassing the adhered element-side substrate 11 and the opposite substrate 13, respectively, and then returning to a normal pressure gradually.

Figure 4A:
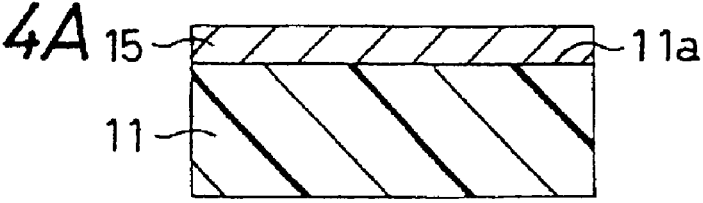
FIGS. 4A to 4D are sectional views showing a process for forming a thin film two-terminal element in steps.
Figure 4B:
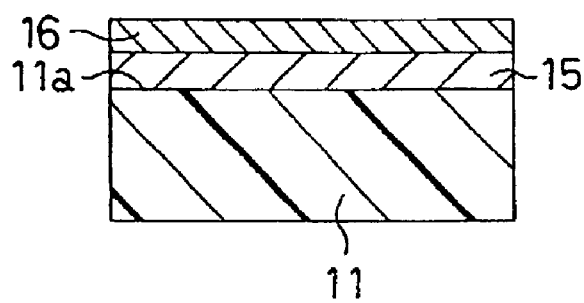
Figure 4C:
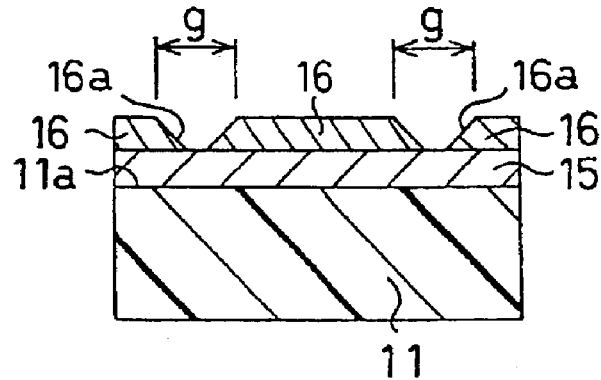
Figure 4D:
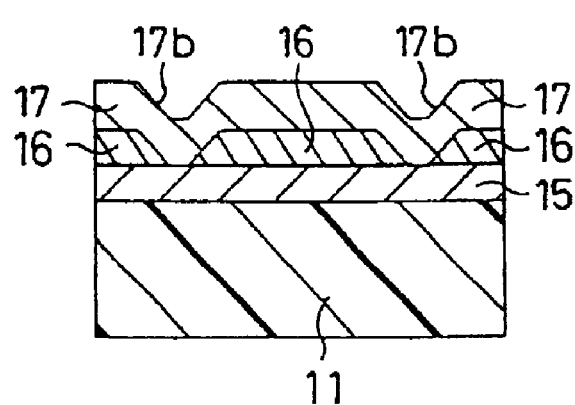

FIGS. 4A to 4D and FIGS. 5A to 5D are sectional views showing a process for forming the thin film two-terminal element 12 in steps. In production of the thin film two-terminal element 12, the insulator layer 15, that is, an aluminum oxide layer is formed so as to be, for example, approximately 100 nm in film thickness on the upper face 11a of the element-side substrate 11 as shown in FIG. 4A, and next, the first conductor layer 16, that is, a tantalum film is formed so as to be, for example, approximately 90 nm in film thickness as shown in FIG. 4B. The aluminum oxide layer and the tantalum film are formed successively by the use of a spattering method as a film forming method thereof. The temperature of the element-side substrate 11 at the time of film formation is 150° C., for example. Secondly, as shown in FIG. 4C, resist patterns are formed by a photolithography process, and the tantalum film to become the first conductor layers 16 is etched by dry etching by the use of fluorine gas, that is, $CF_4$ gas. As a result, minute gaps g are formed at specified intervals, and the first conductor layers 16 are made to be band-shaped. A concave groove 16a forming the minute gap g is formed into a taper shape having a narrower width in a lower part, and therefore, it is possible to easily form the insulator layer 17 and the second conductor layer 19 described later so as to have desired sectional shapes. After that, as shown in FIG. 4D, a silicon oxide film is formed so as to be, for example, approximately 1000 nm in film thickness by spattering.

Figure 5A:
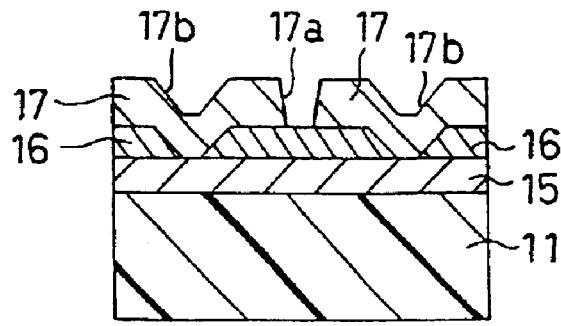
FIGS. 5A to 5D are sectional views showing the process for forming a thin film two-terminal element in steps.
Figure 5B:
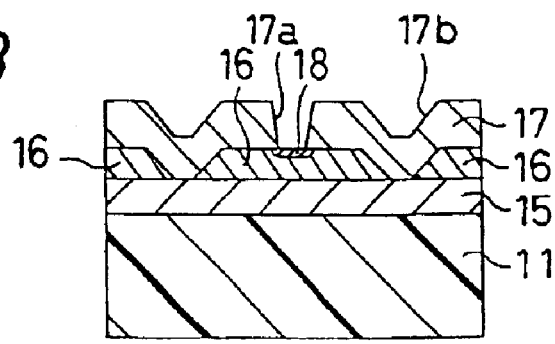
Figure 5C:
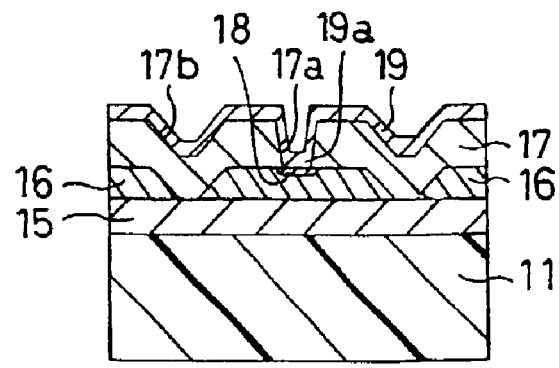
Figure 5D:
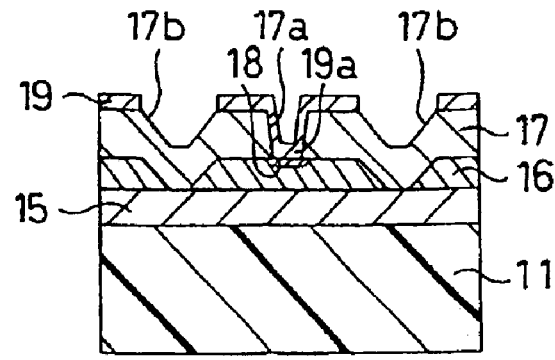

Next, as shown in FIG. 5A, resist patterns are formed by a photolithography process, and the silicon oxide film to become the insulator layers 17 is etched by wet etching by the use of a hydrofluoric acid ammonium fluoride aqueous solution, that is, a BHF solution. Next, as shown in FIG. 5B, an anodizing process for forming an anodized film to be the nonlinear resistor layer 18 is executed. This anodizing process is a process for forming an oxide film on a metal film by positioning the substrate 11 with the metal layer to be anodized formed and an opposite electrode in a formation agent and applying a voltage under a condition that a positive potential is on the substrate 11 side. The nonlinear resistor layer 18 having a film thickness of approximately 70 nm is formed by the use of a 1% solution of ammonium tartrate as a formation agent under a condition that a formation voltage is 36 V and a formation current is 0.2 mA/cm². Next, as shown in FIG. 5C, as the second conductor layer 19 to become an electrode applying a voltage to liquid crystal, an optical reflection film and an upper electrode, an aluminum film which is 500 nm in film thickness is formed. After that, as shown in FIG. 5D, resist patterns are formed by a photolithography process, and the aluminum film is etched by wet etching by the use of phosphoric acid. On the insulator layer 17, at a part corresponding to substantially above the concave groove 16a of the first conductor layer 16, a concave groove 17b which has substantially the same sectional shape as the sectional shape of the concave groove 16a is formed. The concave groove 17b is formed into a taper shape having a narrower width in a lower part, so that it is possible to make the film thickness of a part of the aluminum film removed by etching thin uniformly, and it is possible to facilitate etching. It is assumed that a rectangular pattern of the second conductor layer 19 is displaced from a position shown in the view. Therefore, although an etched part is designed to be at the concave groove 17b in the view, the etched part is not restricted to at the concave groove 17b in the view in a case where the pattern is displaced, and there is a case that the etched part is expanded to above the first conductor layer 16.

When a current is supplied to the first conductor layer 16 of the reflective-type liquid crystal display apparatus 10 described above, the current flows to the second conductor layer 19. In a case where a part between the transparent conductor layer 21 and the second conductor layer 19 serving as a pixel electrode is in a selection state, a voltage is applied to between them, and liquid crystal molecules are aligned substantially vertically to the surfaces of the element-side substrate 11 and the opposite substrate 13. Therefore, incident light from the opposite substrate 13 side passes through the liquid crystal layer 14, is reflected by the second conductor layer 19, passes through the liquid crystal layer 14 again, and exits.

According to the reflective-type liquid crystal display apparatus 10 described above, the thin film two-terminal element 12 is formed by laminating the protruding portion 19a of the second conductor layer 19 on the first conductor layer 16 via the nonlinear resistor layer 18, and the insulator layer 17 is positioned between the first conductor layer 16 and the second conductor layer 19 except a region to become the thin film two-terminal element 12. Therefore, processes in which alignment is necessary in production of the thin film two-terminal element 12 are a process for defining a region to form the nonlinear resistor layer 18 and a process for defining the shape of the second conductor layer 19, and it is possible to ensure a requisite alignment margin with respect to deformation of the element-side substrate 11 in the respective processes.

Figure 6:
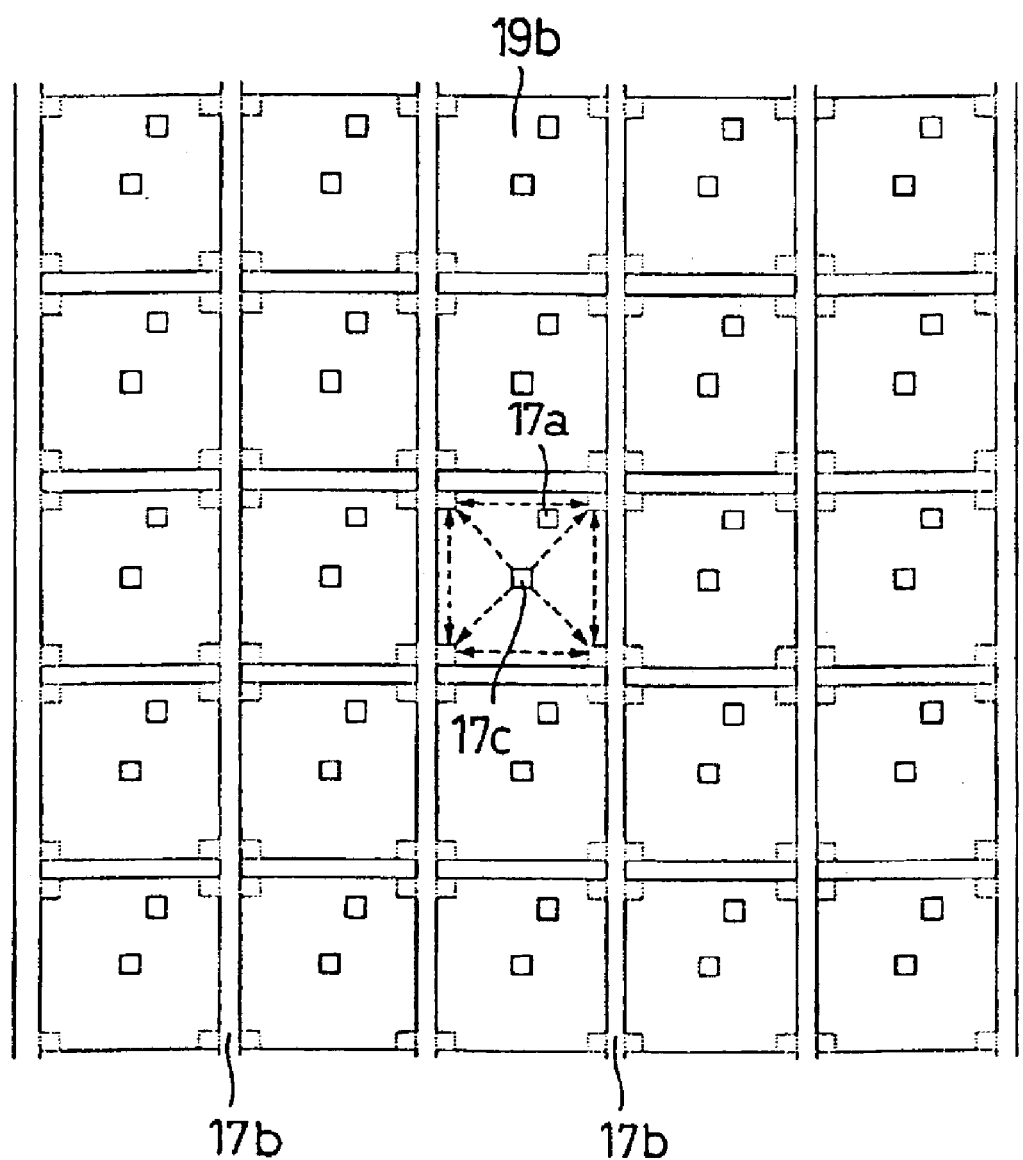
FIG. 6 is a plan view of an element-side substrate for describing an allowance of displacement of patterns defining the positions and shapes of thin film two-terminal elements.
Figure 7:
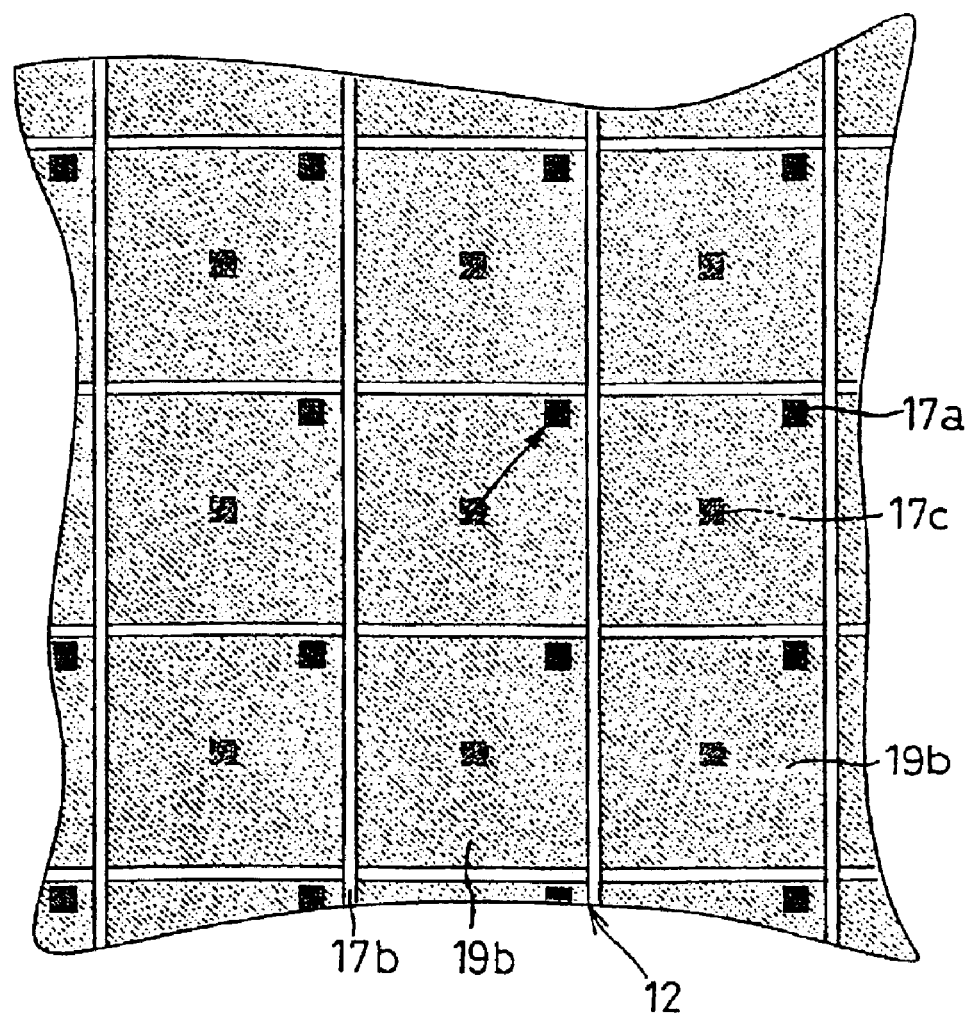
FIG. 7 is a plan view of an element-side substrate showing an example of displacement of patterns defining the positions and shapes of thin film two-terminal elements.
Figure 8:
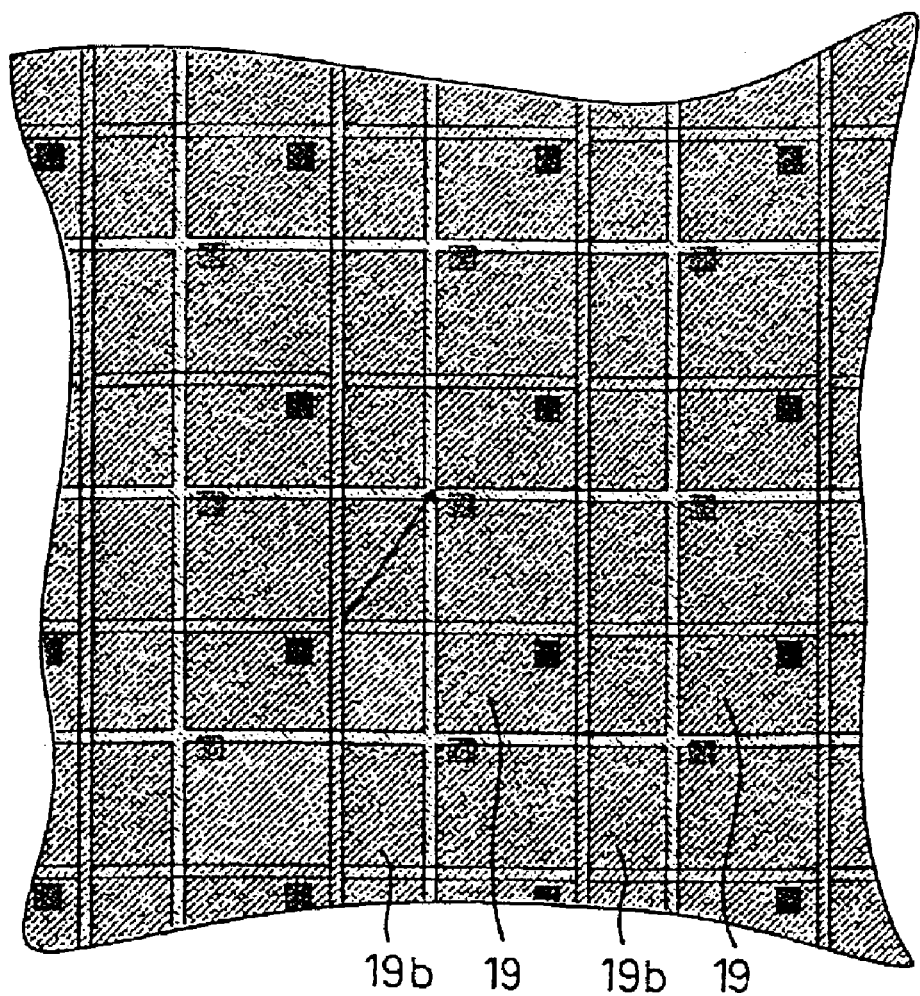
FIG. 8 is a plan view of an element-side substrate showing an example of displacement of patterns of pixel electrodes.

FIG. 6 is schematic view for description showing a plan view of an element-side substrate for describing an allowance of displacement of patterns defining the positions and shapes of thin film two-terminal elements which are determined by the process for defining a region to form the nonlinear resistor layer 18. As to the piercing portion 17a formed on the insulator layer 17, a piercing portion 17c is designed to be formed in a shape shown in FIG. 6, with regard to design. In FIG. 6, a second conductor layer 19b which becomes an upper electrode when it is provided with regard to design, is shown together with the piercing portion 17a. From this drawing, it is understood that the piercing portion 17a may be provided on any position in a range shown in broken arrows of FIG. 6. Consequently, even when the piercing portion 17a which is actually provided is provided, for example, in a shape shown in FIG. 6, there is especially no problem. In the configuration of the invention, and it is described that there is an allowance, i.e., margin of displacement of patterns defining the positions and shapes of thin film two-terminal elements. As to the process for defining the shape of the second conductor layer 19, based on the position of the piercing portion 17a, similarly, it is described that there is an allowance of displacement. Views showing a part of display portion which describes a case where, at the above processes, displacements of patterns of both processes occurs together are shown in FIGS. 7 and 8. FIG. 7 is a plan view of an element-side substrate showing an example of displacement of patterns defining the positions and shapes of thin film two-terminal elements. FIG. 8 is a plan view of an element-side substrate showing an example in a case where displacement of patterns of pixel electrodes and displacement of patterns defining the positions and shapes of thin film two-terminal elements shown in FIG. 7 occur together. From these drawings, it is described that, even when different displacements occur at the two processes, there is especially no problem as the element-side substrate. The above description is a description and illustration about a case where displacement at each process is uniform in plane. However, it is possible to describe similarly with regard to pitch variation of patterns occurring in, e.g., expansion and contraction of the substrate and mask patterns.

In consequence, the allowable range of the relative position of the second conductor layer 19 with respect to the first conductor layer 16 and the nonlinear resistor layer 18 is considerably large as compared with that of the prior art, so that it is possible to ensure a requisite alignment margin with respect to deformation of the element-side substrate 11 in the production process, and it is possible to facilitate production of the thin film two-terminal element 12. Moreover, since a site for only signal wiring and a site for only the thin film two-terminal element 12 are not required, it is possible to make the spacing of pixels narrow, so that it is possible to increase an aperture ratio and it is possible to prevent a display character from being degraded. Besides, it is possible to realize high definition display.

In the case of the liquid crystal display apparatus using the thin film two-terminal element of this embodiment, a part which exerts a display function as a pixel is an intersection where the first conductor layer 16 of the element-side substrate 11 and the transparent conductor layer 21 of the opposite substrate 13 are opposite to each other on both sides of the liquid crystal layer 14 via the liquid crystal orientation film 20 and the liquid crystal orientation film 22 and formed into band shapes so as to be orthogonal to each other. Therefore, it is possible to effectively use a free region around a display region, and additionally form the piercing portion 17a formed on the insulator layer 17 and a substantially rectangular electrode of the second conductor layer 19 so as not to affect display. Since a pattern to become the additional pixel electrode is designed, even when there is displacement of a space for one pixel or more at the time of formation of resist patterns, the additional pattern disposed peripherally moves into the display region to compensate. Therefore, it is possible to ensure a larger alignment margin.

Further, regarding the thin film two-terminal element 12, it is possible to freely set the position and number thereof in a range which satisfies a positioning relation among the first conductor layer 16, the nonlinear resistor layer 18, the second conductor layer 19 and the protruding portion 19a described before. Moreover, since it is possible to form the nonlinear resistor layer 18 by anodized part of the upper face of the first conductor layer 16 after forming the first conductor layer 16, it is possible to further simplify the production process. Furthermore, since the element-side substrate 11 is made of a polymeric resin material, it is possible to make the substrate itself thinner than a glass substrate, and moreover, it is possible to elastically deform as necessary. In consequence, it is possible to apply a substrate made of a resin material to various reflective-type liquid crystal display apparatuses, and it is possible to increase the versatility thereof. Besides, since the insulator layer 15 is disposed between the element-side substrate 11 and the thin-film two-terminal element 12, it is possible to protect the element-side substrate 11 by the insulator layer 15, and moreover, it is possible to prevent that an impurity is discharged from the element-side substrate 11. In addition, it is possible by the insulator layer 15 to simplify an etching process.

As an embodiment of the invention, an example of production of a reflective-type liquid crystal display apparatus is shown above. In the above embodiment, a method of forming the nonlinear resistor layer 18 may be deposition formation by a spattering method or a chemical vapor deposition method (abbreviated to a CVD method).

Further, the order of forming the insulator layer 17 and the nonlinear resistor layer 18 may be changed. Moreover, to the first conductor layer 16 and the second conductor layer 19, a material other than a material shown in the example may be applied as far as it is a conductive material. However, it is desirable that the second conductor layer 19 is made of a light-reflective material in a reflective-type display apparatus. Besides, it is also possible to obtain semi-transmissive-type or transmissive-type display by using light transmission between the thin film two-terminal element 12 and wiring. In addition, it is also possible to obtain transmissive-type display by applying a light-transmissive material to the first conductor layer 16 and the second conductor layer 19.

In addition, the plan shape of the piercing portion 17a is formed in the substantially rectangular shape. However, the plan shape of the piercing portion 17a may be formed in any shape if it is possible to form the protruding portion 19a of the second conductor layer 19 and set an element area of the thin-film two-terminal element 12 to an area which is aimed with regard to design.

As another embodiment of the invention, a reflective-type liquid crystal display apparatus of the invention may be applied to a personal computer, a personal digital assistant, a cell phone and the like, other than an office automation system. For example, a reflective-type liquid crystal display apparatus of the invention can be used in a liquid crystal display mode such as a white tailor display mode. In this case, the polarizing plate 23 or the like is omitted. In the case of forming the second conductor layer 19 into a bumpy shape so as to scatteringly reflect light, the light scattering transmission substrate 24 is omitted. Although an example of monochrome display is shown in this embodiment, it is also possible to obtain color display by a constitution comprising color filters of red, green and blue. Moreover, it is also possible to obtain color display by using a liquid crystal display mode of developing color by the liquid crystal layer 14. The embodiment may be partially changed in various manners in a range without deviating from the scope of the invention.

The above embodiment shows a case that one second conductor layer 19 is formed into a substantially rectangular shape in one pixel. The first embodiment has the following problem. Firstly, there is a problem of alignment of the element-side substrate 11 and the opposite substrate 13 resulting from a relation between the rectangular conductor layer 19 of the element-side substrate 11 and the band-shaped transparent conductor layer 21 of the opposite substrate 13. As shown before, an image is displayed based on the orientation of the liquid crystal molecules of the liquid crystal layer 14 between the second conductor layer 19 and the transparent conductor layer 21 in the selection state, so that alignment of the second conductor layer 19 and the transparent conductor layer 21 is required.

Further, in this embodiment, on band-shaped wiring of the first conductor layer 16, a substantially rectangular pixel electrode of the second conductor layer 19 to apply a signal pulse of selection or data by the wiring is designed to overlie. However, in a case where there is displacement of pattern formation as shown before, the substantially rectangular pixel electrode of the second conductor layer 19 overlaps the adjacent band-shaped wiring of the first conductor layer 16. Such an overlapping part generates capacitance via the insulator layer 17 in spite of not being electrically connected directly. The generation of capacitance incurs a delay of a signal of selection or data, and results in decrease of a display speed or display contrast.

[Second Embodiment]

Figure 9:
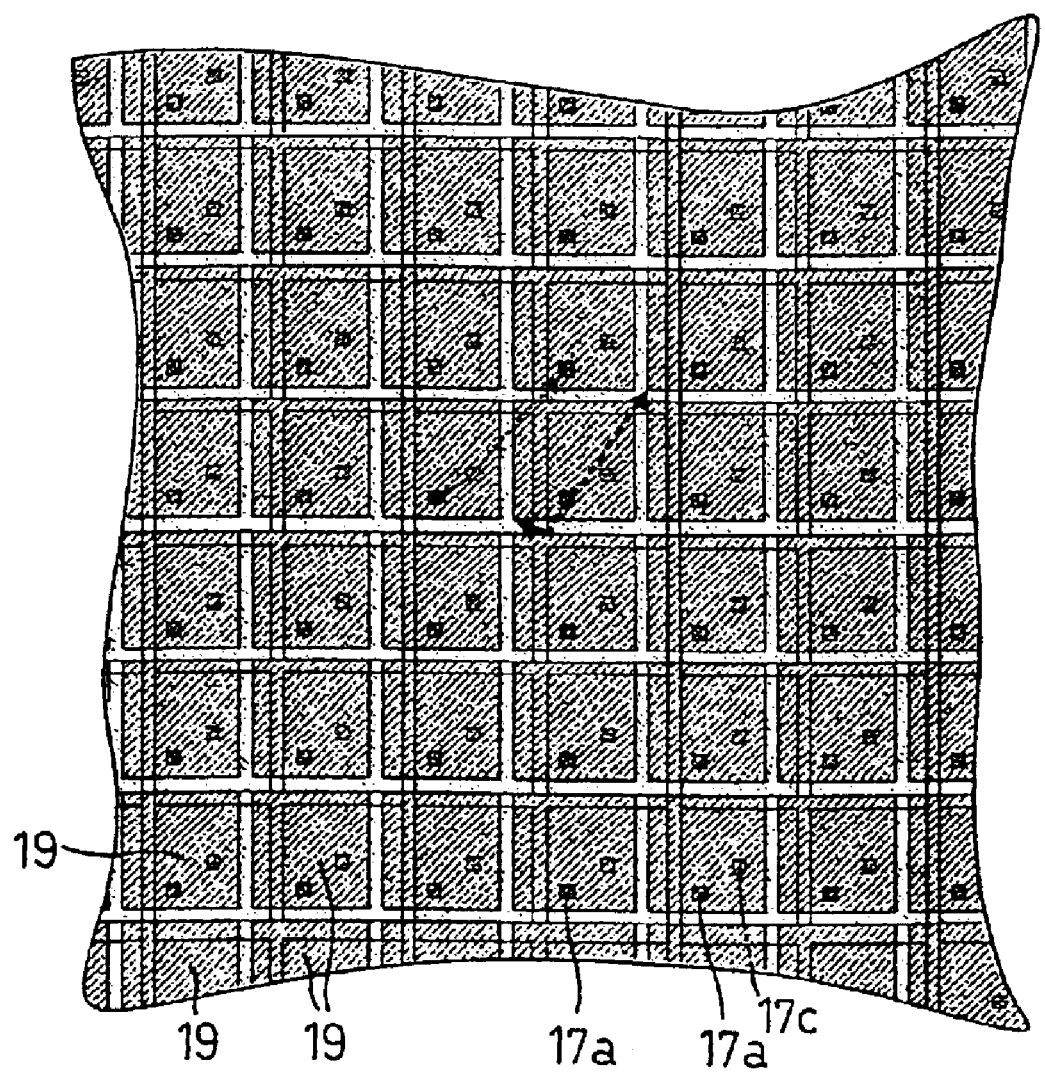
FIG. 9 is a plan view of an element-side substrate showing an example of disposing a plurality of pixel electrodes in one pixel.

FIG. 9 is a plan view of an element-side substrate showing an example of disposing a plurality of pixel electrodes in one pixel. A second embodiment for solving the two problems described above is shown in the following. In the second embodiment, the second conductor layers 19 of the first embodiment are formed into two or more islands for one pixel. This is a structure of connecting the respective island-shaped second conductor layers 19 to the first conductor layers 16 via the nonlinear resistor layers 18 through the piercing portions 17a formed on the insulator layers 17. Regarding the constitution of the liquid crystal display apparatus and the element structure of the element-side substrate, the rest are the same as those of the first embodiment.

FIG. 9 is a concept view for describing the second embodiment, in which, based on the plan view of the element-side substrate 11 of FIG. 3 for describing the first embodiment, the shape of the second conductor layer 19 is changed from a shape of forming one rectangular shape for one pixel to a shape of dividing into plural. In this example, it is divided into two rectangular shapes in the vertical direction and the horizontal direction in the view, respectively. More specifically, the substantially rectangular shapes are formed, for example, at pitches twice of the substantially rectangular shapes of the second conductor layers 19 of the first embodiment. In this embodiment, "a substantially rectangular shape" includes "a rectangular shape." Moreover, the area of the substantially rectangular shape of the piercing portion 17a is designed to become small in response to a change in the area ratio of the substantially rectangular shapes of the conductor layer 19 due to division.

Except the piercing portions 17a are formed in response to division of the respective pixel electrodes in FIG. 5A and the substantially rectangular shapes of the second conductor layer 19 are formed in response to division of the respective pixel electrodes as well in FIG. 5D, the process for forming a thin film two-terminal element shown in FIGS. 4, 5 is the same.

According to the reflective-type liquid crystal display apparatus 10 made by the structure and production process described above, a plurality of second conductor layers 19 are formed into substantially rectangular shapes in one pixel. In this structure, considering displacement of formation of substantially rectangular resist patterns of the piercing portions 17a formed in the insulator layers 17 and the second conductor layers 19, in a case where the amount of displacement is equal to or more than a pitch of the substantially rectangular patterns of the piercing portions 17a formed in the insulator layers 17 or the second conductor layers 19 in one pixel, that is, equal to or more than one half of one pixel in the second embodiment, the adjacent pattern comes from the opposite direction to a direction of the displacement. As a result, while a designed original pattern is displaced from a region of one pixel, an adjacent pattern comes in the region of one pixel, so that there is an effect of apparently making displacement smaller than original.

Further, in this case, there is an effect that in an overlap of the band-shaped wiring of the first conductor layer 16 and the substantially rectangular pixel electrode of the second conductor layer 19, in an overlap of the band-shaped wiring of the adjacent first conductor layer 16 and the substantially rectangular pixel electrode of the second conductor layer 19, the largest area of the overlapping part of the band-shaped wiring of the adjacent first conductor layer 16 and the substantially rectangular pixel electrode of the second conductor layer 19 is smaller than that in a case where the pixel electrode is not divided.

The effect of moderation of the overlapping part on the adjacent wiring is also produced in an overlap on the band-shaped transparent conductor layer 21 of the opposite substrate 13. In this case, even when there is displacement in alignment of the opposite substrate, a decrease of an effective operation part of the pixel is smaller than that in a case where the pixel electrode is not divided.

Further, by designing additional patterns of the piercing portions 17a formed in the insulator layers 17 and the substantially rectangular shapes of the second conductor layers 19 by the use of the free regions around the display regions as in described in the first embodiment, the two effects described above are produced in all the pixels. Although the pixel electrode in one pixel is divided into two in the vertical direction and the horizontal direction in the view, respectively, in the above description, the effects described above are increased in the case of increasing the degree of division, for example, dividing into three or four.

However, the first and second embodiments have a problem as shown below. In a case where a pattern of the piercing portion 17a formed in the insulator layer 17 for forming a thin film two-terminal element is formed between the band-shaped wiring and the adjacent band-shaped wiring of the first conductor layers 16, a lower electrode of the thin film two-terminal element does not exist, so that the element cannot be formed. A pixel electrode of the substantially rectangular pattern of the second conductor layer 19 formed so as to overlie on the piercing portion 17a is not electrically connected to the band-shaped wiring of the first conductor layer 16 via the thin film two-terminal element.

Since a sufficient voltage is not applied to the liquid crystal layer on a part of this pixel electrode, a part incapable of display is made, that is, a display defect is caused. Moreover, also in a case where, when a pattern of the second conductor layer 19 to become a pixel electrode is formed, the pattern of the second conductor layer 19 is formed so that a pattern of the piercing portion 17a formed in the insulator layer 17 exists between the substantially rectangular shape and the adjacent substantially rectangular shape of the second conductor layer 19, the same is caused.

[Third Embodiment]

A third embodiment for solving the above problem is shown below.

In the third embodiment, a plurality of piercing portions 17a formed in the insulator layer 17 are designed to be disposed to the island-shaped second conductor layer 19. This is a structure of, through the piercing portion 17a, connecting the second conductor layer 19 to the first conductor layer 16 via the nonlinear resistor layer 18. Regarding the constitution of the liquid crystal display apparatus and the element structure of the element-side substrate, the rest are the same as those of the first and second embodiments.

Figure 10:
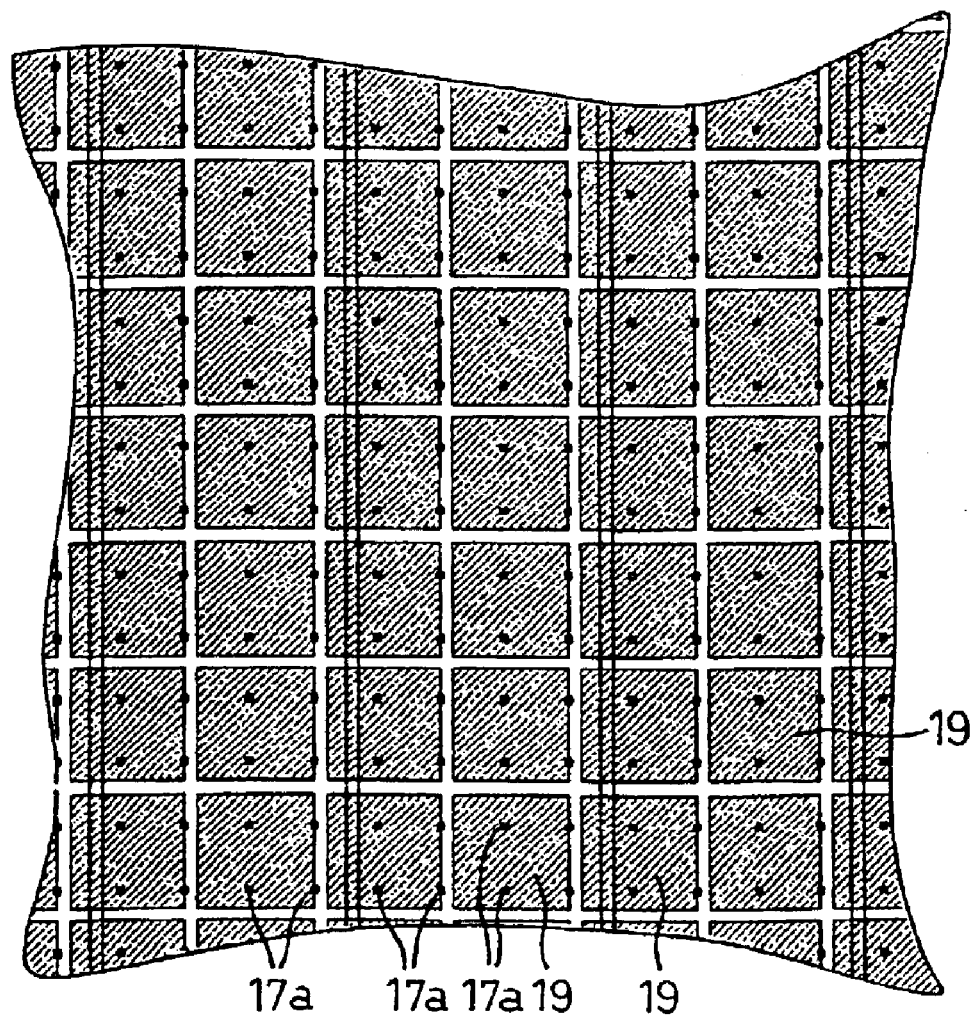
FIG. 10 is a plan view of an element-side substrate showing an example of disposing a plurality of thin film two-terminal elements for one pixel electrode.
Figure 11:
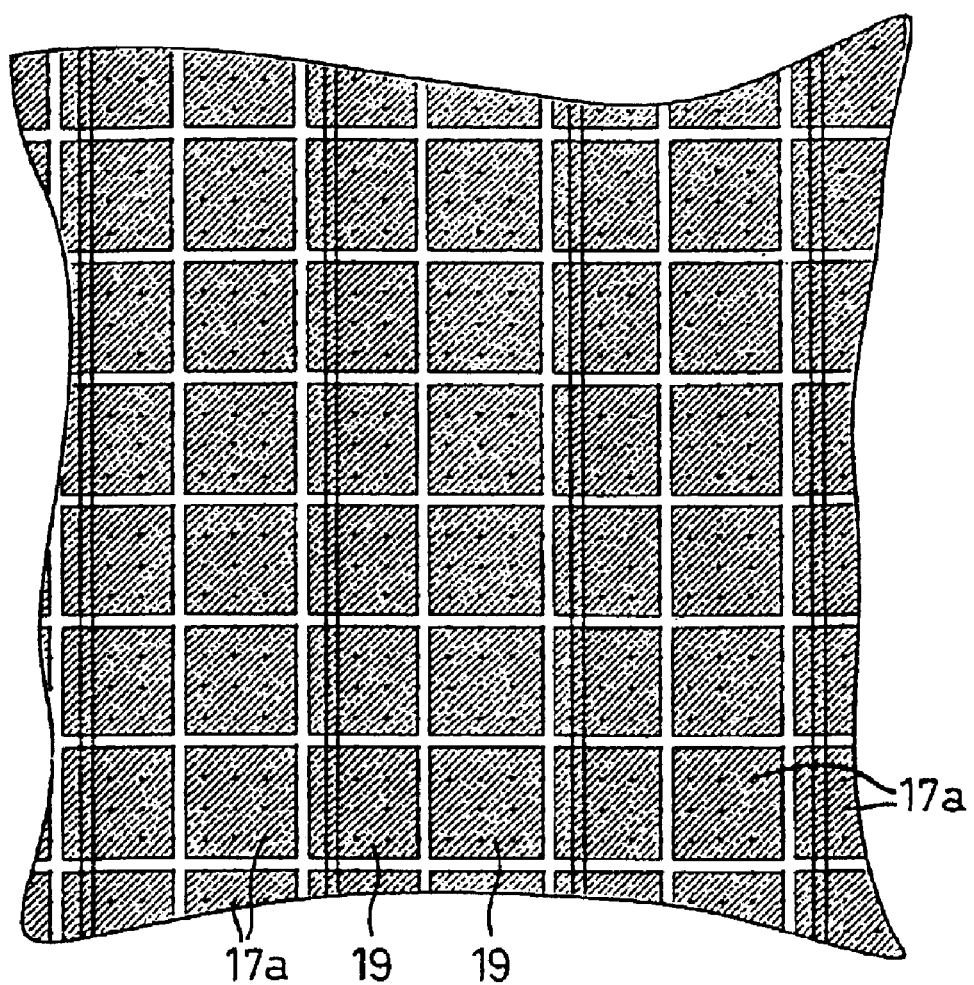
FIG. 11 is a plan view of an element-side substrate showing an example of increasing the number of thin film two-terminal elements for one pixel electrode on the element-side substrate of FIG. 10.

FIG. 10 is a plan view of an element-side substrate showing an example of disposing a plurality of thin film two-terminal elements in one pixel electrode. FIG. 11 is a plan view of an element-side substrate showing an example in which the number of the thin film two-terminal elements in one pixel electrode is increased with regard to the element-side substrate of FIG. 10. More specifically, FIGS. 10, 11 are concept views for describing the third embodiment, in which, based on the plan view of the element-side substrate 11 of FIG. 3 for describing the second embodiment, the shape of the piercing portion 17a formed in the insulator layer 17 is changed to a shape divided into plural so that two or more piercing portions 17a are disposed to one rectangular shape of the second conductor layer 19.

In this example, it is divided into two pitches in the vertical direction and the horizontal direction in the view, respectively. More specifically, the substantially rectangular shapes of the piercing portions 17a are formed at pitches approximately twice of the piercing portions 17a formed in the insulator layer 17 of the second embodiment. Moreover, the area of the substantially rectangular shape of the piercing portion 17a is designed to become small in response to a change in the area ratio of the substantially rectangular shapes of the conductor layer 19.

Except the process in FIG. 5A is changed so that the piercing portions 17a are formed in accordance with division of the respective pixel electrodes as in the second embodiment, the process for forming the thin film two-terminal element is the same as that shown in FIGS. 4, 5.

According to the reflective-type liquid crystal display apparatus 10 made by the structure and the production process described above, a plurality of piercing portions 17a formed in the insulator layers 17 to become thin film two-terminal element parts are designed to be disposed to one pixel electrode. In this structure, considering displacement of formation of substantially rectangular resist patterns of the piercing portions 17a formed in the insulator layers 17 and the second conductor layers 19, in a case where patterns of the piercing portions 17a formed in the insulator layers 17 are formed between the band-shaped wiring and the adjacent band-shaped wiring of the first conductor layer 16, and in a case where a pattern of the second conductor layer 19 is formed so that the patterns of the piercing portions 17a formed in the insulator layers 17 exist between the substantially rectangular shape and the adjacent substantially rectangular shape of the second conductor layer 19, the patterns of the piercing portions 17a exist in the substantially rectangular shape of the second conductor layer 19 by all means. Therefore, there is no pixel electrode that is not electrically connected.

Further, in driving of a liquid crystal display apparatus by a thin film two-terminal element, a voltage applied to a liquid crystal layer is defined by a ratio of capacitance of the liquid crystal layer and the thin film two-terminal element. Then, based on a relation between a characteristic of a voltage of ON-and-OFF-driving of the thin film two-terminal element and the ratio of capacitance, a voltage of a (pulse) signal of selection or data applied to a pixel is defined. As a result, in a case where the number of the piercing portions 17a formed in the substantially rectangular shape of the second conductor layer 19 changes, a voltage applied to the liquid crystal layer changes, so that a difference in display is caused among the pixel electrodes. However, by further increasing the division number of the piercing portions 17a, it is possible to reduce a change in the capacitance ratio described before even when the piercing portion 17a exists between patterns of the wiring and the pixel electrode.

However, in the case of dividing the pixel electrode and the thin film two-terminal element of the second and third embodiments, there is a problem of a processing method of the piecing portion 17a formed in the insulator layer 17, that is, a processing method for defining the size of the thin film two-terminal element. In the above embodiments, the element size of the thin film two-terminal element 12 is the area of the piercing portion 17a formed in the insulator layer 17. In driving of the liquid crystal display apparatus by the thin film two-terminal element, a voltage applied to the liquid crystal layer is defined by a ratio of capacitance of the liquid crystal layer and the thin film two-terminal element.

Then, based on a relation between a characteristic of a voltage of ON-and-OFF-driving of the thin film two-terminal element and the ratio of capacitance, a voltage of a (pulse) signal of selection or data applied to a pixel is defined. In general, in the case of a thin film two-terminal element whose nonlinear material is an anodized film of tantalum, the electric capacitance ratio described before needs to be, for example, one to ten or more in the ratio of the thin film two-terminal element to the liquid crystal layer. Then, although depending on the thickness of the liquid crystal layer, the dielectric ratio of a liquid crystal material, and the thickness and dielectric ratio of the nonlinear material of the thin film two-terminal element, it is necessary to design the element in the ratio of the electrode area of the liquid crystal layer to the electrode area of the thin film two-terminal element, for example, in the ratio of approximately 1 to 100.

Although the electrode area of the thin film two-terminal element is defined by the area of the piercing portion 17a formed in the insulator layer 17 in the embodiments shown above, in the case of increasing the division number of the pixel electrode and reducing the area of the pixel electrode for one substantially rectangular shape of the conductor layer 19, it is necessary to reduce the processing size of the piercing portion 17a in order to reduce the area of the piercing portion 17a formed in the insulator layer 17. However, because of a problem of the accuracy of pattern formation of photolithography for forming a pattern of the piercing portion 17a and an etching process, there is a limit to reduce the processing size.

[Fourth Embodiment]

Figure 12:
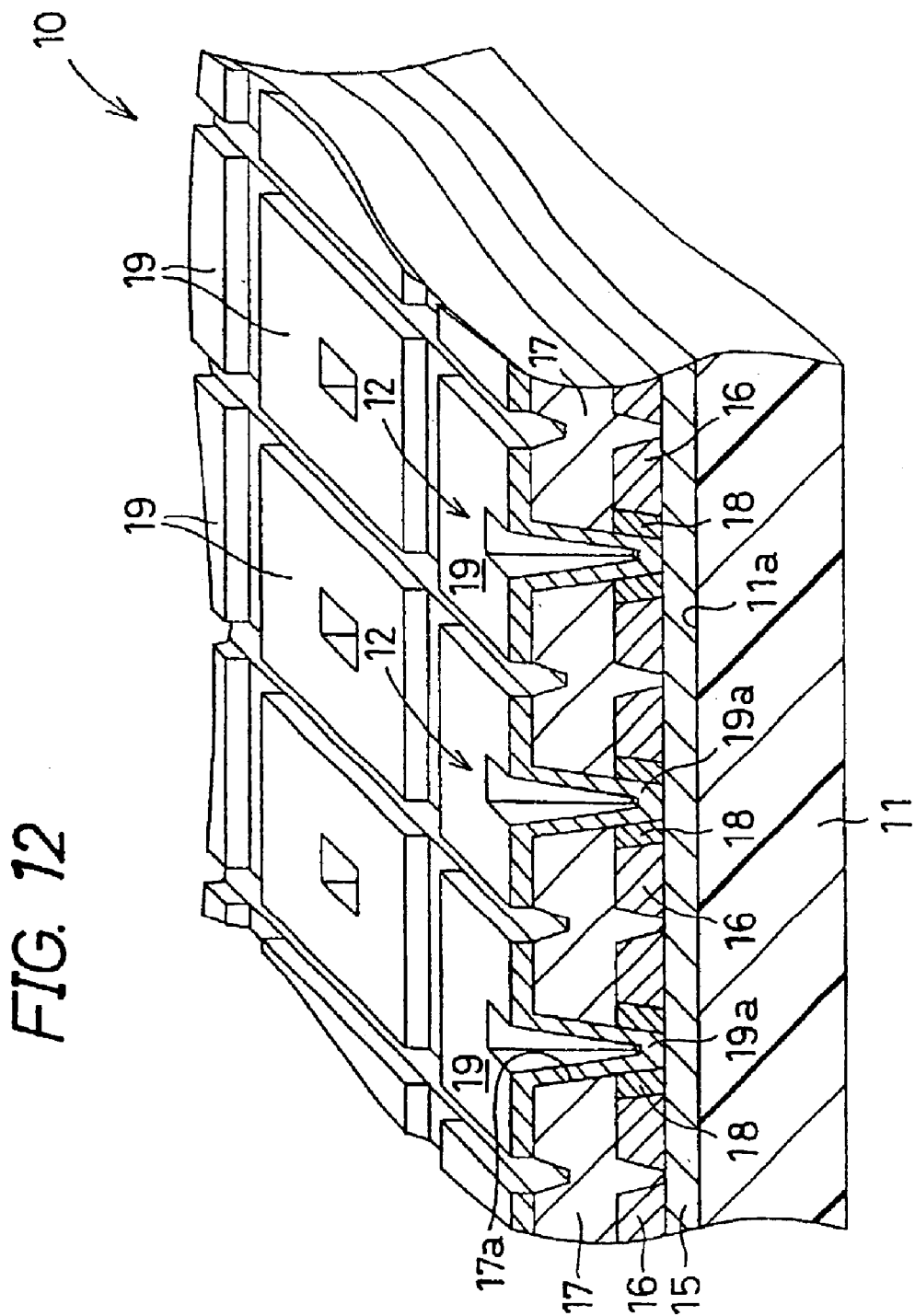
FIG. 12 is a perspective view relating to a fourth embodiment of the invention and showing, by cutting away, a substantial part of an element-side substrate for describing a thin film two-terminal element in which a nonlinear resistor layer is disposed to a side face of a first conductor layer film.
Figure 13A:
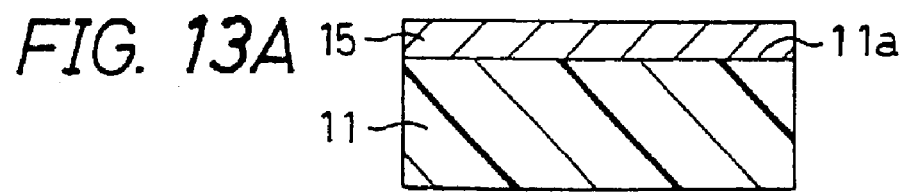
FIGS. 13A to 13D are sectional views showing a process for forming a thin film two-terminal element in which a nonlinear resistor layer is disposed to a side face of a first conductor layer film in steps.
Figure 13B:
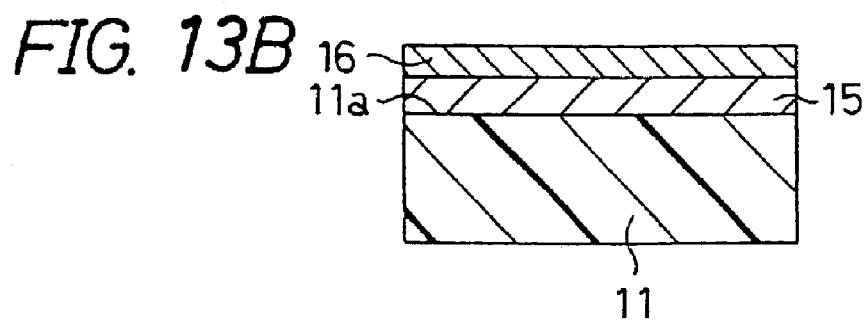
Figure 13C:
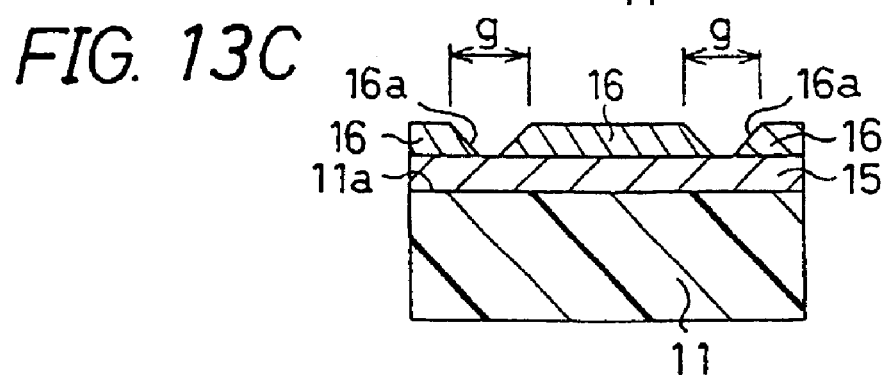
Figure 13D:
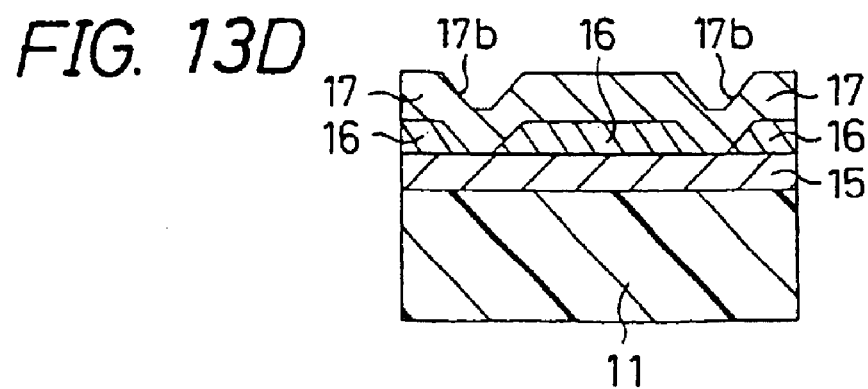

FIG. 12 is a perspective view relating to a fourth embodiment of the invention and showing, by cutting away, a substantial part of an element-side substrate for describing a thin film two-terminal element which has a nonlinear resistor layer disposed to a side face of a first conductor layer film. The fourth embodiment for describing the element structure that solves the problem of the size of the thin film two-terminal element is shown. Since the structure of the reflective-type liquid crystal display apparatus 10 in the fourth embodiment is the same as that of the first embodiment, it will be described referring to a perspective view of FIG. 12 showing a substrate on a thin film two-terminal element side, which shows the structure of the reflective-type liquid crystal display apparatus 10 in more detail.

In the fourth embodiment, until the first conductor layer 16 is formed, the structure is the same as that of the first embodiment. The piercing portion 17a penetrates the first conductor layer 16, and the nonlinear resistor layer 18 is formed on the side face of the penetrated portion of the first conductor layer 16. Then, in a state where part of the protruding portion 19a of the second conductor layer 19 abuts on the nonlinear resistor layer 18 through the piercing portion 17a, a plurality of second conductor layers 19 which cover the most part of the insulator layers 17 continuously with the piercing portions 17a are formed. Regarding the structure, the rest are the same as those of the first embodiment.

Figure 14A:
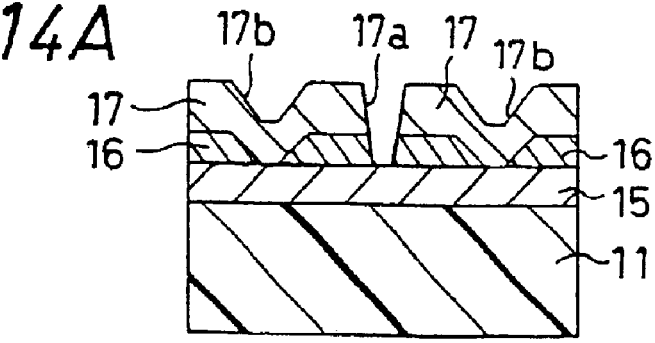
FIGS. 14A to 14D are sectional views showing the process for forming a thin film two-terminal element in which a nonlinear resistor layer is disposed to a side face of a first conductor layer film in steps.

FIGS. 13A to 13D and FIGS. 14A to 14D are sectional views showing a process for forming a thin film two-terminal element which has a nonlinear resistor layer disposed to a side face of a first conductor layer film in steps. FIGS. 13A to 13D show the same production process as that of the first embodiment. Next, as shown in FIG. 14A, a resist pattern is formed by a photolithography process, and a silicon oxide film, which is the insulator layer 17, is etched by wet etching by the use of a hydrofluoric acid ammonium fluoride aqueous solution. Subsequently, by dry etching by the use of fluorine gas, a tantalum film, which is the first conductor layer 16, is etched.

Figure 14B:
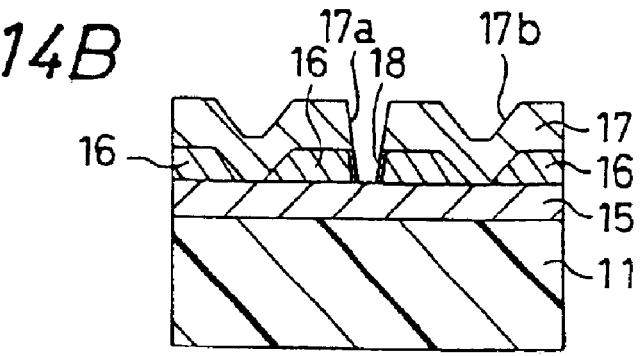

Next, as shown in FIG. 14B, an anodizing process for forming an anodized film, which is the nonlinear resistor layer 18, is executed. This anodizing process is the same as described in the first embodiment, and the nonlinear resistor layer 18 having a thickness of, for example, approximately 70 nm in the vertical direction is formed on the side face of the first conductor layer 16. Moreover, although the side face of the piercing portion 17a formed on the insulator layer 17 and the first conductor layer 16 is drawn straight in FIG. 14B, the volume of an oxidized part may increase by anodizing, and there is a case that the surface of the nonlinear resistor layer 18 protrudes from the side face of the piercing portion 17a.

Figure 14C:
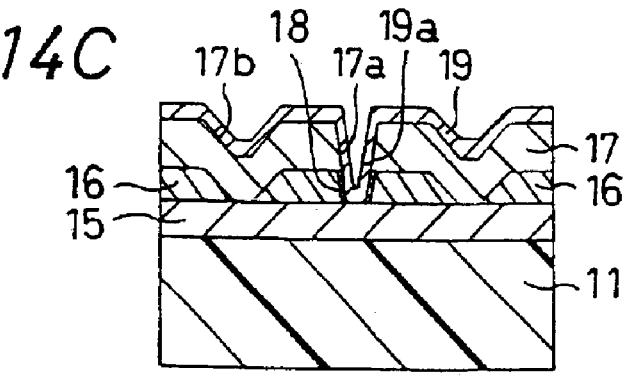
Figure 14D:
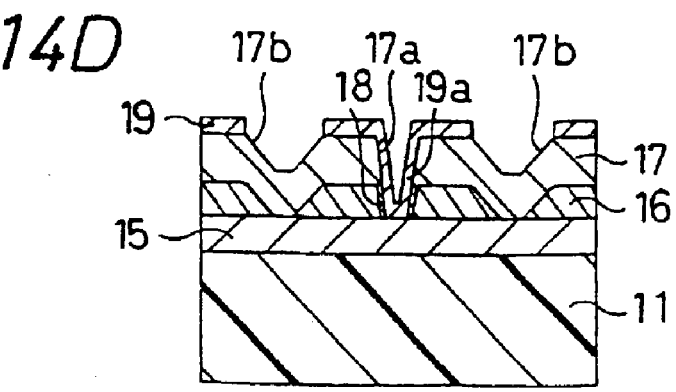
Figure 15:
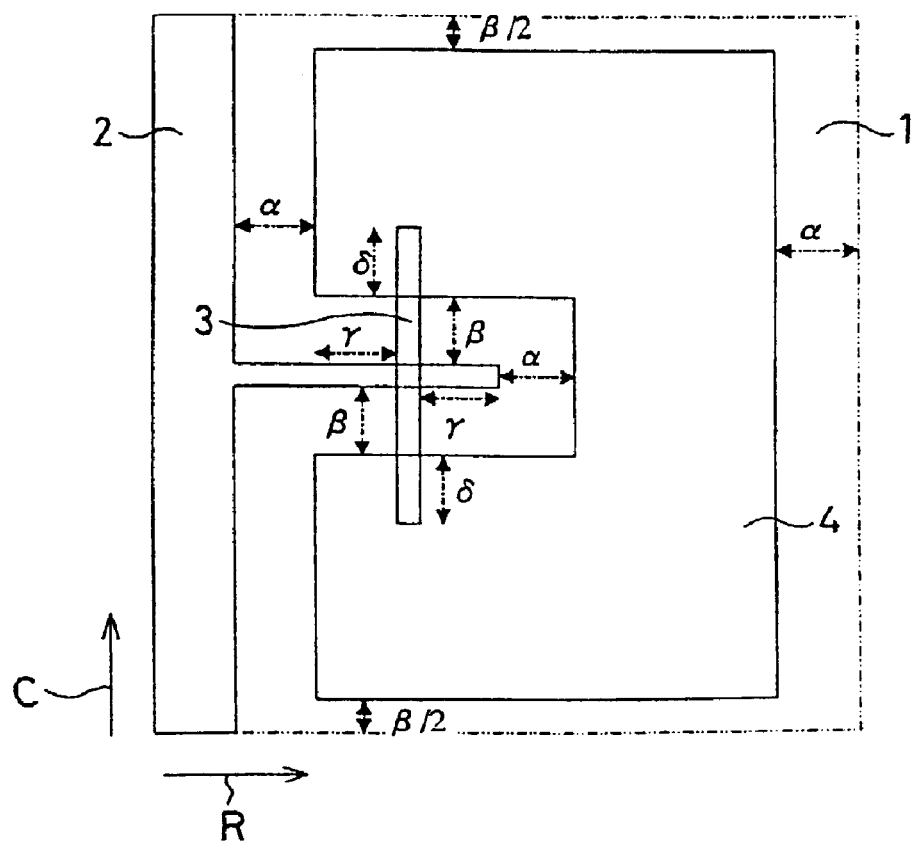
FIG. 15 is a plan view showing one pixel of a reflective-type liquid crystal display apparatus in which a conventional thin film two-terminal element is formed.
Figure 16:
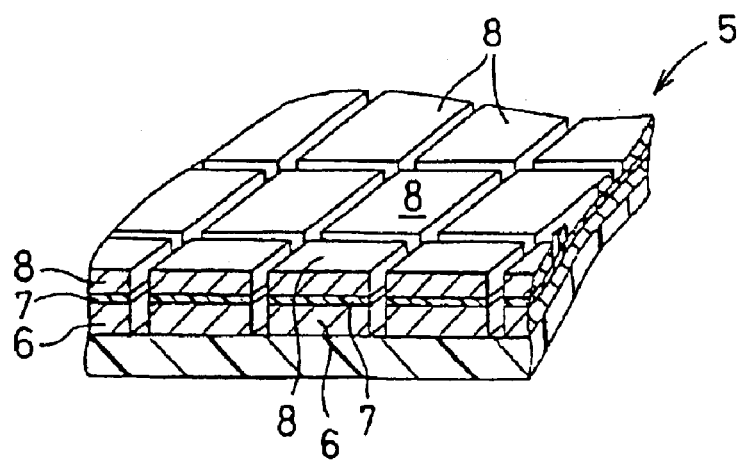
FIG. 16 is a perspective view showing, by cutting away, a substantial part of a conventional reflective-type liquid crystal display apparatus.

Next, as shown in FIG. 14C, an aluminum film which is, for example, approximately 500 nm in film thickness is formed as the second conductor layer 19. At this moment, the second conductor layer 19 is formed continuously so as to cover the side face of the piercing portion 17a formed on the insulator layer 17 and the first conductor layer 16. Then, a pattern of the second conductor layer 19 is formed in the same process as in the first embodiment.

In the thin film two-terminal element of the fourth embodiment, the element area is found by multiplying the length of the circumference of the penetrated portion in the first conductor layer 16 by the piercing portion 17a and the film thickness of the first conductor layer 16 together. In this embodiment, the film thickness of the conductor layer 16 is, for example, approximately 50 nm or more and 350 nm or less, and it is a small value as compared with the accuracy of pattern formation of photolithography or etching process. Therefore, even when forming the piercing portion 17a by the same method as in the first embodiment, it is possible to form a thin film two-terminal element having a small element area. Accordingly, by using the thin film two-terminal element having a structure of this embodiment, it is possible to increase the division number of the pixel electrode and the thin film two-terminal element shown in the second and third embodiments.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A liquid crystal display apparatus having a display region comprising:

a one-side substrate and an other-side substrate which are oppositely positioned a specified space apart;

a liquid crystal layer which is interposed between the one-side substrate and the other-side substrate;

a first conductor layer which is formed into a strip on a surface of one substrate of the one-side substrate and the other-side substrate, the surface being on the side of the one substrate facing the other substrate;

a second conductor layer which is disposed to the one substrate of the one-side substrate and the other-side substrate; and a nonlinear resistor layer which is formed on the first conductor layer, wherein:

at least part of the second conductor layer is laminated to the first conductor layer via the nonlinear resistor layer to form at least one or more thin film two-terminal element, and an insulator layer is provided between the first conductor layer and the second conductor layer except a region to become the thin film two-terminal element; and each of the first conductor layer and the second conductor layer cover the entire display region except a part for forming the nonlinear resistor layer, a part for separating wiring lines, and a part for separating electrodes.

2. The liquid crystal display apparatus of claim 1, wherein the nonlinear resistor layer is disposed to a side face of the first conductor layer.

3. The liquid crystal display apparatus of claim 2, wherein the nonlinear resistor layer is formed on the side face of a region of the first conductor layer penetrated by a protruding portion of the second conductor layer.

4. The liquid crystal display apparatus of claim 1, wherein a pixel electrode formed by the second conductor layer, and the first conductor, the nonlinear resistor layer and the insulator layer for forming the thin film two-terminal element are formed also in a peripheral region of a designed display region.

5. The liquid crystal display apparatus of claim 1, wherein the second conductor layer has an optically reflecting function.

6. The liquid crystal display apparatus of claim 1, wherein the nonlinear resistor layer is an anodized film of the first conductor layer.

7. The liquid crystal display apparatus of claim 1, wherein the one substrate is made of a resin material.

8. The liquid crystal display apparatus of claim 1, wherein another insulator layer is further disposed between the one substrate and the thin film two-terminal element.

9. The liquid crystal display apparatus of claim 1, wherein the second conductor layer is to become a pixel electrode and the second conductor layer includes a plurality of pixel electrodes in one pixel.

10. The liquid crystal display apparatus of claim 1, wherein a plurality of thin film two-terminal elements are formed with respect to one pixel electrode formed by the second conductor layer.

* * * * *